Aug. 27, 1963 W. THUMM ET AL 3,102,015
PRODUCTION OF SO$_2$ AND O$_2$ CONTAINING GASES SUITABLE
FOR THE PRODUCTION OF ELEMENTAL SULFUR
Filed Feb. 19, 1960 2 Sheets-Sheet 1

INVENTORS
WILHELM THUMM,
RUDOLF BECKER,
BY
Bailey, Stephens & Huettig
ATTORNEYS

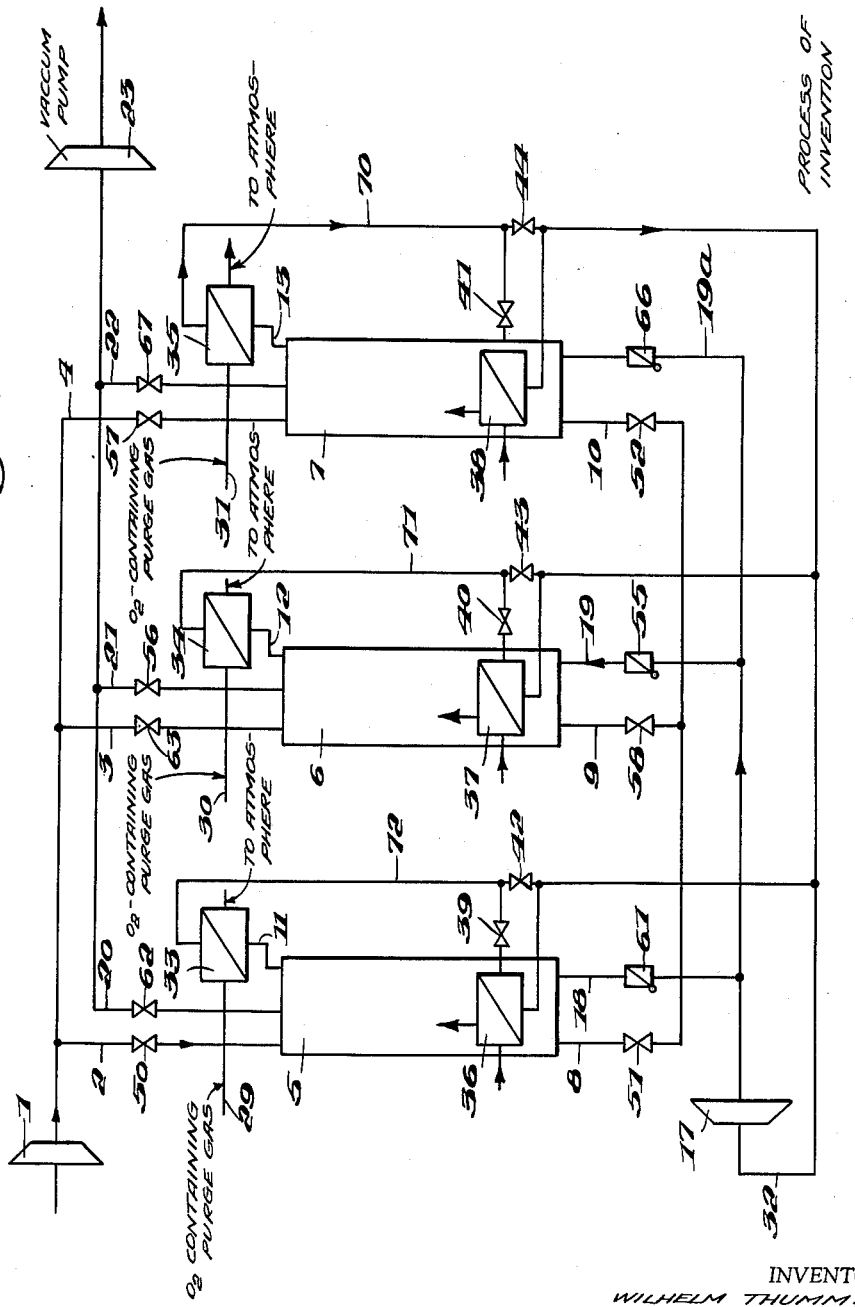

United States Patent Office 3,102,015
Patented Aug. 27, 1963

3,102,015
PRODUCTION OF SO₂ AND O₂ CONTAINING GASES SUITABLE FOR THE PRODUCTION OF ELEMENTAL SULFUR
Wilhelm Thumm, Frankfurt am Main and Rudolf Becker, Munich-Solln, Germany, assignors to Gesellschaft für Linde's Eismaschinen A.G., Hollriegelskreuth, near Munich, Germany
Filed Feb. 19, 1960, Ser. No. 9,737
Claims priority, application Germany Mar. 6, 1957
3 Claims. (Cl. 62—12)

The present invention relates to an improved process for the production of $SO_2$ and $O_2$ containing gases suitable for the production of elemental sulfur starting from gases containing less than 30% of $SO_2$.

The production of elemental sulfur from $SO_2$ containing gases by reduction with C or H containing reducing agents, such as coke, CO, mineral oil and $H_2S$, is already known. A large number of variations of this process have become known but all have one common factor, namely, that only $SO_2$ gases of a certain concentration range are employed. $SO_2$ containing gases which are too dilute, namely, those containing less than 30% of $SO_2$, require relatively high quantities of reducing agent and have relatively high exhaust gas losses. On the other hand, gases with too small an oxygen content do not ignite. Depending upon the content of inert ballast gases, especially of $CO_2$ and nitrogen, the upper limit of the $SO_2$ concentrations employed lies between about 55 and 90% $SO_2$. With preheating and mixing pure oxygen with 100% pure $SO_2$, this upper limit can be raised to about 95%.

When relatively dilute $SO_2$ containing gases, that is, those containing less than 30% of $SO_2$, are to be worked up into elemental sulfur, they are generally first converted into pure $SO_2$. Several procedures are available for this purpose. The most modern and those previously most economical depend upon purely physical concentration by compressing and cooling to condense the $SO_2$ content. As these physical concentration processes were by far the most economical, the older concentration processes, which depended upon the principle of scrubbing out the $SO_2$ and driving off the absorbed $SO_2$ with oxygen free gases at elevated temperatures, have been replaced thereby, so that an $SO_2$ containing gas with the required concentration of $SO_2$ for conversion to elementary sulfur is obtained directly.

According to the older processes, care was taken to produce $SO_2$ containing gases as free of oxygen as possible, as it was thought technically and economically possible to raise the $SO_2$ containing gas to ignition temperatures by heat exchange alone. This, however, is not practically possible, especially when coke is used as the reducing agent. Consequently, as indicated above, oxygen containing $SO_2$ gases of the concentrations indicated are used exclusively.

In the accompanying drawings:

FIG. 1 shows by way of example a flow sheet of the most modern and economical process developed prior to the present invention for working up $SO_2$ containing gases by compression and cooling, which, however, as yet is not a part of the known state of the art; and FIG. 2 shows a flow sheet of the process according to the invention.

Referring to the process developed prior to the present invention shown in FIG. 1, the dilute $SO_2$ containing gas (in practice gases with 6–14% $SO_2$ are most available) is supplied to regenerator 5 at a pressure of 1.6 atmospheres by turbine blower 1 over conduit 2 and valve 50. The gas is cooled to $-130°$ C. in the regenerator 5 and $SO_2$ deposits in liquid and solid form on the filling bodies in the regenerator. The remaining gas having a residual $SO_2$ content of below 0.2% which has been cooled to about $-130°$ C. leaves regenerator 5 over conduit 8 and is supplied over valves 51 and 52 and conduit 10 to regenerator 7 which it cools to about $-120°$ C. and then is exhausted to the atmosphere over valve 53 and conduit 13. A portion of the gas stream flowing through regenerator 7 is branched off at 16 and supplied to regenerator 6 over turbine 17, valve 59, conduit 32, check valve 55 and conduit 19 and the other portion is exhausted to the atmosphere over conduit 13. Turbine 17 cools the gas stream supplied to regenerator 6 by adiabatic expansion and provides sufficient cooling capacity that the losses are covered. Regenerator 6 is still filled with solid $SO_2$ from a previous operation phase and is at a temperature of about $-130°$ C. The pressure in regenerator 6 is maintained at about 0.1 atmosphere and at this lower pressure the relatively warm gas evaporates the solid $SO_2$ and the resulting $SO_2$ containing gas is passed into cooling plant 24 over valve 56, line 21 and vacuum pump with turboblower 23. The gas supplied to cooling plant 24 contains about 50% $SO_2$ so that the recovery of 100% $SO_2$ with specially good efficiency is possible in cooling plant 24 from which pure $SO_2$ may be withdrawn through line 68. Cooling plant 24 is intentionally run so that complete separation of $SO_2$ is not effected and that a considerable quantity of residual $SO_2$ is retained in the gas passed therethrough. Expediently the concentration of $SO_2$ in the gases leaving cooling plant 24 is maintained the same as that of the crude gases supplied to blower 1 and it is recycled over conduits 25 and 26 to regenerator 5. As soon as regenerator 5 can take up no further $SO_2$ and the $SO_2$ deposited in regenerator 6 has been driven off and regenerator 7 has been cooled down, the operation of the regenerators is switched. In the second or respectively the third switching phase, the regenerator 7 or respectively 6 is supplied with the crude gases over line 4 or respectively 3, and the gases leaving regenerator 7 or respectively 6 are supplied to regenerator 6 or respectively 5 over lines 10 and 9 or respectively lines 9 and 8. A portion of the gas is bled off to the atmosphere over line 12 or respectively 11 and the remainder is passed to regenerator 5 or respectively 7 over conduit 15 or respectively 14, turbine 17 and line 18 or respectively 19a. The gas loaded with $SO_2$ is then supplied to the cooling plant 24 over line 20 or respectively 22 and turbine 23. A gas stream having about the same composition of the crude gases is recycled from there to regenerator 7 or respectively 6 over lines 25 and 28 or respectively 27. Valves 57 and 63 correspond to valve 50, valves 62 and 67 correspond to valve 56 and valves 59 and 64 correspond to valve 53. Furthermore, valves 51, 52 and 58 correspond to each other. Valve 60 or respectively valve 65 takes over the function of valve 54 and valve 61 or respectively 66 takes over the function of valve 55.

According to the process described with reference to FIG. 1, it is possible to recover 100% $SO_2$ from 12% gases with an energy expenditure of 250 kwh. per ton of 100% $SO_2$.

The present invention provides an improvement over the process described with reference to FIG. 1. As it is not necessary to produce 100% $SO_2$ in the preliminary concentration in working up $SO_2$ containing gases to elementary sulfur, the evaporation of the deposited solid $SO_2$ is, according to the invention, not effected by a portion of the gas stream of the gas from which the $SO_2$ has been removed but rather by air or other oxygen containing gases. In this way it is possible to obtain an oxygen containing gas with the necessary 30 to 80%, preferably about 50%, $SO_2$ for the production of elemental sulfur (if necessary dried with silica gel) directly at the outlet of regenerator 6. The further concentration to about 100% with the aid of cooling plant 24 and recyling of the end gas from the cooling plant to the regenerator system is then not necessary as the remainder of the gas not consisting of $SO_2$ is an oxygen containing gas rather than useless ballast gas. Consequently, a large cooling plant such as 24 is not required and therefore plant investment costs are decreased and the cost of operating cooling plant 24 and of recycling the end gas to the regenerators is obviated.

The process according to the invention is schematically illustrated in FIG. 2 and similar parts thereof are given the same reference numerals as in FIG. 1. The flow of the $SO_2$ containing gas and the exhaust gas is identical with that in FIG. 1 up to conduit 13. The regeneration is effected by an oxygen gas, preferably air, which is drawn in through conduit 31 and supplied to regenerator 6 over conduit 19. Pump 23 serves to maintain a sufficient reduced pressure of, for example, 0.5–0.15 atmosphere in regenerator 6. Expediently a turbine 17 is provided in line 32 ahead of conduits 18, 19 and 19a. Such turbine could also be replaced by a throttling valve. As the oxygen containing gas with which the condensed and solid $SO_2$ deposited in regenerator 6 is driven off, in general, is warmer than the stream of $SO_2$ free gas branched off from regenerator 7 according to FIG. 1, it is expedient according to a special embodiment according to the invention to precool it somewhat by heat exchange with the relatively cold gas of regenerator 7.

This precooling is first achieved with the aid of heat exchanger 35, into which the $O_2$ containing gas enters through line 31 and leaves over line 70. The cooling of heat exchanger 35 is effected by the cold gas stream leaving regenerator 7 over line 13. In the event the cooling thereby effected on the $O_2$ containing gas is insufficient a second heat exchanger 38 is provided within regenerator 7. The latter heat exchanger is cooled by the gas stream entering regenerator 7 over line 10 which naturally is colder at this point than when it enters heat exchanger 35. A portion of all of the gas leaving heat exchanger 35 over line 70 can then be passed through heat exchanger 38 with the aid of valves 41 and 44 and be further cooled in the latter heat exchanger. It is therefore possible to adjust the temperature of the gas supplied to line 32 to the most favorable value by altering the quantity of the gas passed through heat exchanger 38.

In the second or third switching phase the oxygen containing gas is supplied over line 30 or respectively 29. Heat exchangers 34 and 37 or respectively 33 and 36 fulfill the function of heat exchangers 35 and 38 while valves 40 and 43 or respectively 39 and 42 take over the function of valves 41 and 44. Lines 71 and 72 correspond to line 70. The remaining reference numerals have the same significance as in FIG. 1.

The following example will serve to illustrate the operation of the process according to the invention with reference to FIG. 2.

*Example*

21,100 Nm.³/h. (normal cubic meters per hour) or 27,598 normal cubic yards per hour of a gas containing 85% $N_2$, 3% $O_2$ and 12% $SO_2$ were compressed to an absolute pressure of 1.5 atmospheres. The gas was cooled to −128° C. in regenerator 5 and left such regenerator with a 0.2% $SO_2$ content and was passed off to the atmosphere over regenerator 7.

Simultaneously, as the $SO_2$ was being condensed in regenerator 5, regenerator 6 in which $SO_2$ had been condensed in a previous phase was rinsed with 1700 Nm.³/h.=2,223.6 normal cubic yards per hour of air which was first precooled by heat exchange with the gases passing through regenerator 7 and decompressed to a pressure of 0.3 atmosphere absolute in turbine 17. The gas reached regenerator 6 at a temperature of about −132° C. and a pressure of about 0.1 atmosphere absolute was maintained in regenerator 6. The gas mixture leaving regenerator 6 contained about 60° $SO_2$, 8% $O_2$ and 32% $N_2$ and amounted to about 4200

$$Nm.^3/h.=5,493.6$$

normal cubic yards per hour. Such gas mixture contained a sufficient amount of oxygen for maintaining the reduction temperature for the production of sulfur.

According to a special embodiment of the invention it is also possible to work up moist $SO_2$ containing gases without predrying. Corrosion of turboblower 1, which in this embodiment is expediently replaced by a compressor, by condensation is hindered by working above the dew point utilizing heat of compression. In a subsequent indirect cooling to about the original inlet temperature or below, most of the water carried along separates off. The remaining water which separates off as ice in regenerator 5 must be sublimed together with the $SO_2$.

According to a further embodiment of the invention the driving off of the $SO_2$ is not effected under high vacuum. In such instance a low pressure blower can replace pump 23 for drawing off the concentrated $SO_2$ gases. Such blower can be protected against corrosion by the use of lead, stainless steels, rubber or plastics.

According to the invention it is possible to obtain directly gases with an $SO_2$-content of 30–60, preferably 50–60%. The remainder being air. The oxygen content of these gases is 14–8%, preferably 10–8%. When working with air enriched in oxygen or with pure oxygen it is possible to obtain gases with still higher concentrations of $SO_2$, namely, from 60–80%, whose oxygen content is still sufficient to ensure ignition of a reducing agent.

This is a continuation-in-part of application Serial No. 719,367, filed March 5, 1958, now abandoned.

We claim:

1. In a process for the production of an $SO_2$ and $O_2$ containing gas mixture suitable for the production of elemental sulfur by reduction of the $SO_2$ contained therein from dilute $SO_2$ containing gases containing less than 30% of $SO_2$, the steps which comprise compressing the dilute $SO_2$ containing gas mixture; leading said gas mixture in a first switching period of operation in one direction through a first regenerator to cool the gas mixture and to condense out the $SO_2$ therefrom, leading the resulting cold $SO_2$-free gas through a second regenerator to cool this regenerator, cooling an $O_2$ containing gas in counter-current heat exchange with said cold $SO_2$-free gas, expanding the cold $O_2$ containing gas and leading it through a third regenerator to evaporate the $SO_2$ condensed in a foregoing switching period of operation; leading the dilute $SO_2$ containing gas mixture in a second switching period of operation in one direction through the second regenerator to cool the gas mixture and to condense out the $SO_2$ therefrom, leading the cold $SO_2$-free gas through the third regenerator to cool this regenerator, cooling an $O_2$ containing gas in counter-current heat exchange with said cold $SO_2$-free gas, expanding the cold $O_2$ containing gas and leading it through the first regenerator to evaporate the $SO_2$ condensed in the foregoing switching period of operation; leading the dilute $SO_2$ containing gas mixture in a third switching period of operation in one direction through the third regenerator to cool the gas mixture and to condense out the $SO_2$ therefrom, leading the cold $SO_2$-free gas through the first regenerator to cool this regenerator, cooling an $O_2$ containing gas in counter-current heat exchange with said cold $SO_2$-free gas, expanding the cold $O_2$ containing gas and leading it through the second regenerator to evaporate the $SO_2$ condensed in the foregoing switching period of operation; the cold $SO_2$ free gas and the expanded cold $O_2$ containing gas in each switching period being passed through the respective regenerators indicated in a direction opposite to that in which the dilute $SO_2$ containing gas had been led through such respective regenerators in the foregoing switching periods and the quantity of $O_2$ containing gas employed in each switching period of operation to evaporate the $SO_2$ condensed in the foregoing switching period of operation being such to produce directly a gas containing about 30–80% of $SO_2$ and about 8 to 15% of $O_2$.

2. The process of claim 1 in which the dilute $SO_2$ containing gases employed as starting material contain 6–14% of $SO_2$.

3. The process of claim 1 in which such quantities of oxygen containing gas are passed over the condensed $SO_2$ to effect its vaporization to produce a gas containing about 50–60% of $SO_2$.

References Cited in the file of this patent

UNITED STATES PATENTS

| | | |
|---|---|---|
| 945,111 | Smith | Jan. 4, 1910 |
| 1,417,068 | Howard | May 23, 1922 |
| 1,931,817 | Hogan et al. | Oct. 24, 1933 |
| 1,946,489 | De Jahn | Feb. 13, 1934 |
| 1,954,879 | Leverett | April 17, 1934 |
| 2,088,814 | Schmalenbach | Aug. 3, 1937 |
| 2,249,193 | Titlestad | July 15, 1941 |

FOREIGN PATENTS

| | | |
|---|---|---|
| 644,139 | Germany | April 24, 1937 |
| 707,079 | Germany | June 13, 1941 |
| 744,928 | Germany | Jan. 31, 1944 |
| 755,226 | France | Sept. 4, 1933 |